US011277508B2

United States Patent
McGarvey

(10) Patent No.: US 11,277,508 B2
(45) Date of Patent: Mar. 15, 2022

(54) METHOD FOR GENERATING AN SMS MESSAGE AND EQUIPMENT FOR IMPLEMENTING THE METHOD

(71) Applicant: ORANGE, Issy-les-Moulineaux (FR)

(72) Inventor: Brendan McGarvey, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/763,783

(22) PCT Filed: Nov. 5, 2018

(86) PCT No.: PCT/IB2018/001553
§ 371 (c)(1),
(2) Date: May 13, 2020

(87) PCT Pub. No.: WO2019/097303
PCT Pub. Date: May 23, 2019

(65) Prior Publication Data
US 2020/0374383 A1 Nov. 26, 2020

(30) Foreign Application Priority Data
Nov. 17, 2017 (EP) .................................... 17306600

(51) Int. Cl.
*H04M 1/72436* (2021.01)
*H04W 4/14* (2009.01)
*G06Q 30/00* (2012.01)

(52) U.S. Cl.
CPC ......... *H04M 1/72436* (2021.01); *H04W 4/14* (2013.01); *G06Q 30/016* (2013.01)

(58) Field of Classification Search
CPC ... H04M 1/72436; H04W 4/14; G06Q 30/016
See application file for complete search history.

(56) References Cited

U.S. PATENT DOCUMENTS

| 6,204,848 | B1 | 3/2001 | Nowlan et al. |
| 8,849,323 | B2* | 9/2014 | Salonen ................ H04L 12/189 |
| | | | 455/466 |
| 9,531,862 | B1* | 12/2016 | Vadodaria ............... H04L 51/32 |

(Continued)

FOREIGN PATENT DOCUMENTS

| EP | 2490164 A1 | 8/2012 |
| WO | 2016120476 A1 | 8/2016 |

OTHER PUBLICATIONS

Technical Specification "3rd Generation Partnership Project; Technical Specification Group Core Network and Terminals; Technical realization of the Short Message Service (SMS) (Release 13)", 3rd Generation Partnership Project (3GPP TS 23.040), V13.2.0 (Sep. 2016).

(Continued)

*Primary Examiner* — Tadesse Hailu
(74) *Attorney, Agent, or Firm* — David D. Brush; Westman, Champlin & Koehler, P.A.

(57) ABSTRACT

A computer-implemented method is proposed, which comprises generating at least one SMS message, wherein the at least one SMS message comprises a predefined character pattern followed by one or several character sequences respectively corresponding to actions responsive to the at least one SMS message suggested to a user recipient of the at least one SMS message.

18 Claims, 4 Drawing Sheets

(56) References Cited

U.S. PATENT DOCUMENTS

| | | | |
|---|---|---|---|
| 9,715,496 B1* | 7/2017 | Sapoznik | G10L 15/26 |
| 2006/0064652 A1* | 3/2006 | Ahokas | G06F 3/0236 |
| | | | 715/864 |
| 2007/0298819 A1* | 12/2007 | Hronek | H04M 1/72552 |
| | | | 455/466 |
| 2008/0275864 A1* | 11/2008 | Kim | G06F 16/9535 |
| 2009/0104925 A1* | 4/2009 | Aula | H04L 12/1868 |
| | | | 455/466 |
| 2009/0125499 A1* | 5/2009 | Cross | H04L 67/306 |
| 2013/0282750 A1* | 10/2013 | Paul | G06F 16/334 |
| | | | 707/767 |
| 2015/0058720 A1 | 2/2015 | Smadja et al. | |
| 2015/0134389 A1* | 5/2015 | Punera | G06Q 10/0631 |
| | | | 705/7.15 |
| 2016/0150387 A1* | 5/2016 | Myers | H04M 1/72552 |
| | | | 455/466 |
| 2017/0180276 A1* | 6/2017 | Gershony | H04L 51/16 |
| 2017/0193557 A1* | 7/2017 | Peter | G06F 16/9558 |
| 2018/0083898 A1* | 3/2018 | Pham | G06F 40/274 |
| 2018/0210874 A1* | 7/2018 | Fuxman | G06F 40/35 |
| 2018/0336524 A1* | 11/2018 | Van Os | H04M 1/72552 |
| 2020/0106726 A1* | 4/2020 | Pham | H04L 51/08 |
| 2020/0160397 A1* | 5/2020 | Mullane | H04L 51/10 |

OTHER PUBLICATIONS

Technical Specification "3rd Generation Partnership Project; Technical Specification Group Core Network and Terminals; Technical realization of Cell Broadcast Service (CBS) (Release 14)", 3rd Generation Partnership Project (3GPP TS 23.041), V14.0.0 (Sep. 2016).

Technical Specification "Digital cellular telecommunications system (Phase 2+); Technical realization of the Short Message Service (SMS) Point-to-Point (PP) (GSM 03.40)", Version 5.3.0, Jul. 1996.

International Search Report dated Mar. 12, 2019 for corresponding International Application No. PCT/IB2018/001553, filed Nov. 5, 2018.

Written Opinion of the International Searching Authority dated Mar. 12, 2019 for corresponding International Application No. PCT/IB2018/001553, filed Nov. 5, 2018.

* cited by examiner

METHOD FOR GENERATING AN SMS MESSAGE AND EQUIPMENT FOR IMPLEMENTING THE METHOD

CROSS-REFERENCE TO RELATED APPLICATIONS

This Application is a Section 371 National Stage Application of International Application No. PCT/IB2018/001553, filed Nov. 5, 2018, the content of which is incorporated herein by reference in its entirety, and published as WO 2019/097303 on May 23, 2019, in English.

FIELD OF THE DISCLOSURE

The present disclosure relates to the field of telecommunications.

BACKGROUND OF THE DISCLOSURE

Short message service (SMS), also commonly referred to as text messaging, has been widely used as a messaging service since the early development of GSM (2G) cellular networks, based on the ETSI GSM recommendation 03.40, which is now maintained by the $3^{rd}$ Generation Partnership Project (3GPP) organization as Technical Specification 23.040. The 3GPP technical specification TS 23.041 also defines a broadcast service for SMS messages to mobile users located in a specified geographical area.

Even though each SMS message is limited to a 160 character payload, and alternative messaging applications/services have emerged with other data communication technologies, in particular using mobile Internet on mobile user equipment (UE) with data connectivity, SMS messages are still used nowadays not only for communication between users, but also to interact with automated systems, for example in mobile marketing applications.

In particular, the use of enterprise SMS-messaging, known as "Application to Person" (A2P) SMS messaging, has been steadily increasing over the last decade, with specific uses such as Customer Relationship Management (CRM) messaging (e.g. for notifying commercial events, such as sales, or confirming completion of a bank wire, etc.). As the A2P segment is growing, it would be desirable to enhance the user interaction for recipients of A2P SMS messages.

There is therefore a need for a method to assist users in interacting with message originator further to the reception of an A2P SMS message.

There is a further need to improve the user interaction with a message originator, be it another user or an application, upon receipt of an SMS message.

SUMMARY

In an aspect of the present subject disclosure, a computer-implemented method is proposed, which comprises: generating at least one SMS message, wherein the at least one SMS message comprises a suggested action section comprising a predefined character pattern followed by one or several character sequences respectively corresponding to actions (e.g. replies) responsive to the at least one SMS message suggested to a user recipient of the at least one SMS message.

The proposed method advantageously provides the generation of at least one SMS messages in which actions (such as, for example, replies) suggested to the recipient are included, and can be processed at the recipient device, and restituted on a user interface in a specific way so as to ease the use or implementation of such suggested actions.

The proposed method further advantageously uses the standard format of SMS messages, and proposes a new type of content or payload for SMS messages.

In some embodiments, at least one of the actions suggested to the user recipient is a reply to the received at least one SMS message. In such cases, suggested actions responsive to the received SMS messages may be suggested replies to the received SMS messages.

In some embodiments, the suggested action section further comprises a user interface command for restituting respective portions of the one or several character sequences on a user interface of a user recipient device.

In such case, for a recipient device configured to process such received user interface command(s), respective portions of the one or several character sequences contained in received SMS messages, be it one single SMS message or concatenated SMS messages, can be restituted on a user interface of a user recipient device, so as to ease user interaction for replying to the received SMS message(s).

In some embodiments, the user interface command comprises a display command for restituting the respective portions of the one or several character sequences on a graphical user interface of the user recipient device in association with respective buttons comprised in the graphical user interface displayed on a touch sensitive display device (e.g. a touchscreen) of the user recipient device.

In some embodiments, the generating at least one SMS message comprises generating a sequence of at least two SMS messages, wherein the last SMS message of the sequence comprises the suggested action section comprising the predefined character pattern followed by the one or several character sequences.

In some embodiments, the predefined character pattern comprises a second predefined character preceded by a first predefined character, and wherein the first and second predefined characters are separated by an action prompt text, for example a response prompt text.

In some embodiments, the last SMS message of the sequence only comprises the predefined character pattern followed by the one or several character sequences, or the action prompt text in between the first and second predefined characters, followed by the one or several character sequences.

In another aspect, a signal carrying at least one SMS message generated using a proposed method of the present subject disclosure, is proposed.

In yet another aspect, a computer device, comprising a processor, a memory operatively coupled to the processor, and a server messaging engine operatively coupled to the processor, wherein the processor is configured to control the server messaging engine to perform any of the proposed methods of the present subject disclosure, is proposed.

In yet another aspect, a method for receiving at least one SMS message is proposed, which comprises: receiving the at least one SMS message, wherein the at least one SMS message comprises a suggested action section comprising a predefined character pattern followed by one or several character sequences respectively corresponding to actions responsive to the received at least one SMS message suggested to a user recipient of the at least one SMS message; interpreting the predefined character pattern; identifying in the at least one SMS messages the suggested action section, based on the interpretation of the predefined character pattern; identifying in the suggested action section the one or several character sequences, based on the interpretation of the predefined character pattern; and restituting on a user interface the one or several character sequences and at least one command corresponding to an action among actions responsive.

A user of a recipient device is then advantageously directed to perform actions that are suggested in the body of the received SMS message(s), so that the user experience with respect to actions responsive to a received SMS message is simplified and therefore improved.

In some embodiments, at least one of the actions suggested to the user recipient is a reply to the received at least one SMS message. In such cases, suggested actions responsive to the received SMS messages may be suggested replies to the received SMS messages.

In such cases where at least some of the suggested actions consist in a suggested reply to a received SMS, the communication between a sender (e.g. a bot) and a user of a recipient device is simplified and therefore improved.

In some embodiments, the suggested action section comprises a user interface command for restituting respective portions of the one or several character sequences on a user interface of a user recipient device, and the identifying comprises identifying the user interface command in the suggested action section, and the restituting comprises, for each of the one or several character sequences, restituting the respective portions on the user interface according to the user interface command.

In such cases, the user experience is enhanced through enriching the user interface on the user device, by restituting on the user interface the suggested actions.

In some embodiments, the user interface command comprises a command for generating a graphical user interface comprising the respective portions of the one or several character sequences in association with respective buttons to be displayed on a touch sensitive display device of the user recipient device, and the restituting comprises displaying on the touch sensitive display device the portions of the one or several character sequences in association with their corresponding buttons of the graphical user interface.

Use of buttons with labels corresponding to suggested actions on a graphical user interface of the recipient device further improve the user experience by simplifying the interaction that the user needs with the user device in order to react to the received SMS message(s): the user merely needs to select one of the buttons restituted on the GUI, including pushing on the selected button, to trigger an action responsive to the received SMS message(s). The use of buttons on a graphical user interface makes it very intuitive for a user to react to the received SMS message(s), and spares the need to write a message in response to the received SMS message(s). In some embodiments, the received at least one SMS message comprises a sequence of at least two SMS messages, the last SMS message of the sequence comprises the suggested action section comprising the predefined character pattern followed by the one or several character sequences, and the identifying the suggested action section based on the predefined character pattern comprises identifying the suggested action section in the last SMS message of the sequence.

In some embodiments, the predefined character pattern comprises a second predefined character preceded by a first predefined character, and the first and second predefined characters are separated by an action prompt text.

In some embodiments, the proposed method further comprises: receiving a user input on the touch sensitive display device corresponding to depressing one of the displayed buttons, and generating an SMS message comprising the portion of the one or several character sequences displayed in association with the respective buttons.

According to another aspect, a communication device is proposed, which comprises a processor, a memory operatively coupled to the processor, a client messaging engine operatively coupled to the processor, and a user interface operatively coupled to the processor, wherein the processor is configured to control the client messaging engine and the user interface to perform a method for receiving at least one SMS message as proposed herein.

In yet another aspect, a computer program product comprising computer program code tangibly embodied in a computer readable medium, said computer program code comprising instructions to, when provided to a computer system and executed, cause said computer to perform any of the proposed methods of the present subject disclosure, is proposed. A set of data representing, through compression or encoding, such a computer program, is also proposed, according to another aspect.

In another aspect, a non-transitory computer-readable storage medium storing a computer program that, when executed, causes a system comprising a processor operatively coupled with a memory, to perform any of the proposed methods of the present subject disclosure, is proposed.

It should be appreciated that the present invention can be implemented and utilized in numerous ways, including without limitation as a process, an apparatus, a system, a device, and as a method. These and other unique features of the methods, signals, devices, sets of data and computer-readable storage media disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DESCRIPTION OF EMBODIMENTS

Figure 1:
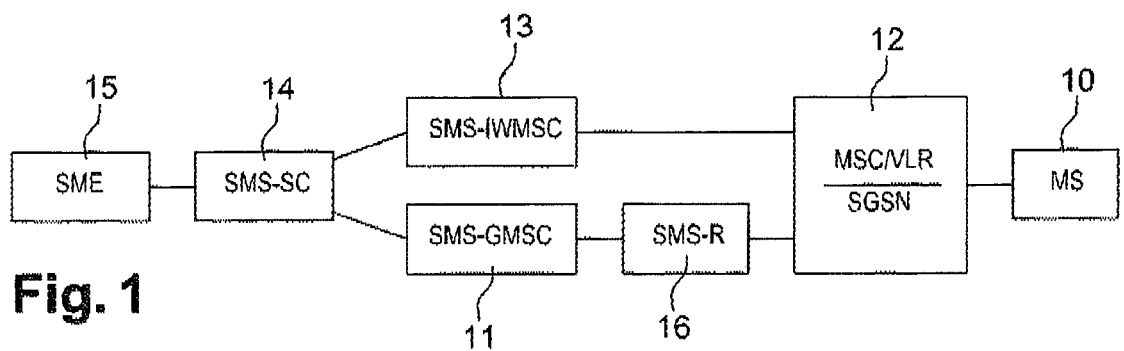
FIG. 1 is a block diagram showing an exemplary network architecture for implementation of the SMS service in GSM/UMTS networks.

The advantages, and other features of the components disclosed herein, will become more readily apparent to those having ordinary skill in the art form. The following detailed description of certain preferred embodiments, taken in conjunction with the drawings, sets forth representative embodiments of the subject technology, wherein like reference numerals identify similar structural elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, or any other suitable medium form that can be used to carry or store program code in the form of instructions or data structures which can be read by a computer processor. Also, various forms of computer-readable media may transmit or carry instructions to a computer, including a router, gateway, server, or other transmission device, wired (coaxial cable, fiber, twisted pair, DSL cable), wireless (infrared, radio, cellular, microwave), or virtual transmission devices (virtual routers, virtual gateways, virtual tunnel end points, virtual firewall). The instructions may comprise code from any computer-programming language or element of computer-programming, including, but not limited to, assembly, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Additionally, the word "exemplary", "for instance", "for example", "typically" as used herein means serving as an example, instance, or illustration. Any aspect or design described herein as "exemplary" is not necessarily to be construed as preferred or advantageous over other aspects or designs.

For purposes of this subject disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A computing device may be capable of sending or receiving signals, e.g. carrying data messages (such as text messages), such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this subject disclosure, the term "network" should be understood to refer to as one or more data links that may couple devices so as to enable the transport of electronic data between computer systems and/or modules and/or other electronic devices, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For purposes of this subject disclosure, the terms "SIM card" (the acronym SIM designating a Subscriber Identity Module) should be understood to refer to any SIM module, in whichever form, including a SIM module implemented on an IC card or not and an integrated SIM chip (so-called "eSIM" as defined by the GSM Association (GSMA)), or to any UICC (Universal Integrated Circuit Card) card, as defined by ETSI (European Telecommunications Standard Institute) which comprises or uses at least one of the SIM, USIM (Universal Subscriber Identity Module), ISIM (IP Multimedia Services Identity Module) and HPSIM (Hosting Party Subscription Identity Module) applications, as defined by the 3GPP organization. A SIM card may include such a UICC card, and the terms SIM card and UICC card are used interchangeably.

Unless specified or limited otherwise, the terms "operatively coupled," "coupled," "mounted," "connected," "supported," and formatives and variations thereof are used broadly and encompass both direct and indirect mountings, connections, supports, couplings, including a connection between devices and/or portions thereof that enables operation(s) in accordance with the proposed method. Further, "connected" and "coupled" are not restricted to physical or mechanical connections or couplings. For example, an operative coupling may include one or more of a wired connection and/or a wireless connection between two or more devices that enables a one and/or two-way communication path between the devices and/or portions thereof. In another example, an operative coupling may include a wired and/or wireless coupling to enable communication between a server of a server environment of the present system and one or more user devices.

Unless specified or limited otherwise, the terms "at least one SMS message" are used broadly, and encompass in particular the cases where a message is generated/received which is composed of one or more SMS messages, for example the case of a single SMS message or the case of concatenated SMS messages which may constitute a message, and the cases of multiple SMS messages.

Unless specified otherwise, the exemplary embodiments hereinafter will be described as applied to a mobile device operable to receive an SMS message (e.g. a mobile device equipped with a SIM card adapted for voice and SMS text communications), and process the received SMS message for restitution on a user interface of at least part of the received SMS message. The mobile device will also be referred to as a "mobile station", a "user device," a "client device," a "recipient user device," a "receiving end," or an "electronic device." A SMS messaging application client hosted by said mobile device may be used to facilitate the processing of received SMS messages as proposed in the present subject disclosure.

The exemplary embodiments described herein are in no way a limitation of the scope of the present subject disclosure as the present teachings could be implemented for other electronic or telecommunication devices configured for receiving SMS messages, such as computers, laptops, PDAs (Personal Digital Assistants), tablets, e-readers, and the likes. More generally any electronic device having communication means for sending and/or receiving SMS messages may benefit from the present teachings.

Unless specified or limited otherwise, the terms "application" or "application program" (AP) and variations thereof are used broadly and encompass any tool that functions and is operated by means of a computer, with the purpose of performing one or more functions or tasks for a user or another application program. To interact with and control an AP, a graphical user interface (GUI) of the AP may be displayed on a device display, and/or an audio user interface of the AP may be reported to the user using a loudspeaker or a headphone or headset output.

In the following, the terms "SMS message" and "Short Message" are used interchangeably.

Turning now to the figures, FIG. 1 is a block diagram showing an exemplary network architecture for implementation of the SMS service in GSM/UMTS networks. Details on the technical realization of the SMS service in GSM/UMTS networks can be found in the 3GPP Technical Specification TS 23.040, for example in its version V 14.0.0 dated March 2017.

The person having ordinary skill in the art would readily understand that, although FIG. 1 shows an exemplary implementation of the Short Message service in a GSM/UMTS networks, the present subject disclosure is not limited thereto, and may be implemented in any mobile network having Short Message service capabilities, for example according to one or several radiocommunication standards such as, GSM, EDGE, CDMA, UMTS, HSPA, LTE, LTE-A, 5G, WiFi (IEEE 802.11) and WiMAX (IEEE 802.16), or their variants or evolutions, now known or later developed.

Shown on FIG. 1 are functional nodes involved in the provision of an SMS message originating from or sent to a mobile station (MS) 10. The mobile station 10 is configured for wireless communication with a mobile network comprising a core network which includes a gateway node 12, such as a Mobile Services Switching Centre/Visitor Location Register (MSC/VLR) node in case of a GSM circuit-switched core network, or an Serving GPRS Support Node (SGSN) in case of a GPRS or UMTS packet switched core network. SMS messages originated from the MS 10 are transferred to a Service Center (SMS-SC) 14 through an Interworking MSC For Short Message Service (SMS-IWMSC) function 13. The SC is a function responsible for the relaying and store-and-forwarding of a short message between a Short Message Entity (SME) 15 and an MS 10. The SME 15 is an entity which may send or receive SMS messages, and may be located in a fixed network, an MS, or an SC.

A short (SMS) message originated from the SME 15 is transferred to the receiving MS 10 (so called "Short Message Mobile Terminated", or SM MT, as opposed to "Short Message Mobile Originated", SM MO) through the SMS-SC 14, a Gateway MSC For Short Message Service (SMS-GMSC) function 11, optionally an SMS Router (SMS-R) function 16, and the gateway node 12 (which may, depending on the type of Core Network, implement an MSC/VLR or an SGSN function).

Depending on the embodiment, the SMS-SC function 14 may be integrated with the SMS-IWMSC 13 and SMS-GMSC 11 functions.

Examples of mobile stations 10 include any electronic device configured for wireless communication with a 3GPP mobile network so as to receive SMS messages and process received SMS messages, such as a laptop computer, a desktop computer, a mobile phone, a smartphone, a personal digital assistant, a tablet computer, a personal computer, a handheld messaging device, an electronic book reader, and the like.

Figure 2:
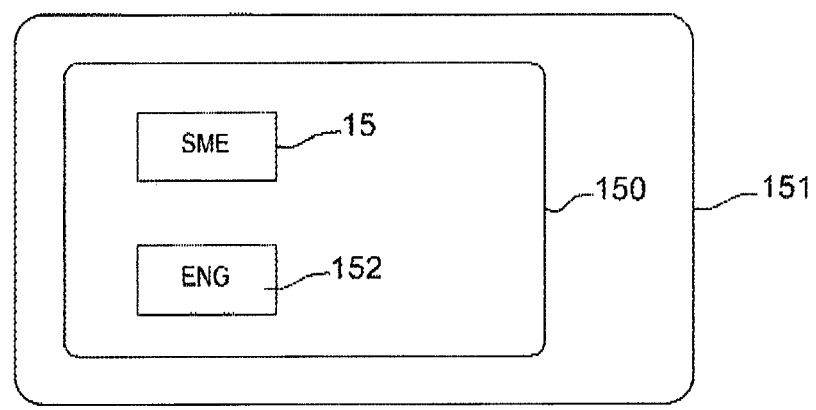
FIG. 2 is a block diagram illustrating an exemplary architecture of a server suitable for use according to one or several embodiments.

Referring now to FIG. 2, a communication device 150 that implements a SME function 15 generates a SMS message according to an exemplary embodiment of the proposed process.

The communication device 150 may be hosted on a server 151, and may be configured for generating at least one SMS message which comprises a predefined character pattern followed by one or several character sequences respectively corresponding to actions suggested to a user recipient of the at least one SMS message, for example through a server messaging engine 152 configured to generate SMS messages with the proposed structure.

In one or more embodiments, the server messaging engine 152 may be configured to generate SMS messages, which each comprises a predefined character pattern followed by one or several character sequences respectively corresponding to actions responsive to the SMS message suggested to a user recipient of the SMS message. In such cases, the proposed predefined character pattern followed by one or several character sequences may be included in a single SMS message which is sent to a recipient, possibly with other content in the SMS message.

As the SMS message containing the predefined character pattern is intended for a recipient with processing capabilities for interpreting such predefined character pattern, the predefined character pattern may be chosen sufficiently unique so that it does not correspond to a used pattern in standard SMS messages. For example, the predefined character pattern may include a sequence of two characters, such as the semicolon character (";;"), possibly followed by a carriage return/line break character: ";;<br>". The person having ordinary skill in the art would readily understand that other predefined character patterns may be used, such as two "Escape" characters immediately following each other ("<esc><esc>"), two colon characters immediately following each other ("::"), or predefined character patterns comprising non-displayable control-characters, such as <esc><rs> or <esc><rs>:<br>, where <rs> is the record separator control character, and that the teachings of the present subject disclosure is not limited to any particular character pattern or any particular type of character pattern. Selection of a character pattern to be used according to the present subject disclosure may also be driven by the benefit of ensuring that recipient device which are not configured for interpreting such character pattern still restitute (e.g. display) the received message in a meaningful way for a user.

The uniqueness of the predefined character pattern may be advantageously used to separate the portion of the SMS message which is to be interpreted according to the present subject disclosure (and as further described below), that is, as including one or several suggested actions, from the possibly other characters of the SMS message which may not be interpreted according to the present subject disclosure (as they may for example be intended to be interpreted by the recipient as standard text content of the message). The portion of the SMS message which is to be interpreted according to the present subject disclosure may comprise one or several character sequences respectively corresponding to actions responsive to the SMS message suggested to a user recipient of the SMS message. The predefined character pattern may therefore serve to flag or mark a boundary of the set of characters included in the SMS message which are to be interpreted according to the present disclosure, which set comprises one or several character sequences respectively corresponding to actions suggested to a user recipient of the SMS message. Therefore, the predefined character pattern will be in one or several embodiments known to the recipient device before reception of the SMS message, and used by such recipient device in the processing of the received SMS message.

Figure 3A:
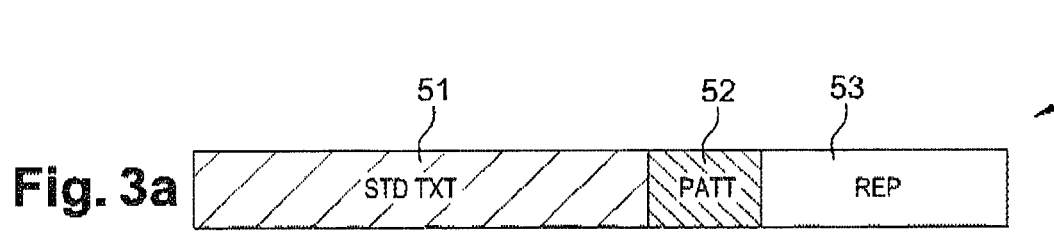
FIG. 3a, 3b, 3c are block diagrams illustrating SMS messages according to one or several embodiments.

In one or more embodiments, the SMS message (50) may be generated so that it first contains a set of one or several characters (51) which are not to be interpreted according to the present subject disclosure (for example which are to be interpreted as standard text content), if any, followed by, in a second part of the SMS message running to the end of the SMS message, the predefined character pattern (52) which is itself followed by the one or several character sequences (53) respectively corresponding to replies to the SMS message suggested to a user recipient of the SMS message, as illustrated on FIG. 3a. The SMS message may be generated so that all characters of the message which are not to be interpreted according to the present subject disclosure (in particular which are not to be interpreted as a predefined pattern or as one or several suggested actions according to the present subject disclosure) may be included at the beginning of the message, before the sequence of predefined character pattern followed by the one or several character sequences respectively corresponding to actions responsive to the SMS message suggested to a user recipient of the SMS message, without any such characters (not to be interpreted according to the present subject disclosure) following in the SMS message the one or several character sequences respectively corresponding to actions responsive to the SMS message suggested to a user recipient of the SMS message.

For example, the SMS message may be of the following type: <standard text content characters><predefined character pattern><suggested actions characters>.

At the recipient end, the processing of such SMS message as received may advantageously be sequential and proceed through the sequence of characters contained in the received SMS message from the first character to the last character of the message. Such sequential processing may be configured for identifying in the received SMS the predefined character pattern, which is known to the recipient device before reception of the message, for example through executing a loop in order to test subsequences of characters, the length of which being equal to that of the predefined character pattern. Upon identification of the pattern, the processing of the SMS message may proceed depending on the structure of the SMS message.

The above-described SMS message structure as illustrated in FIG. 3a advantageously simplifies the processing thereof as such can be limited to the identification of a single predefined character pattern for purposes of identifying the one or several character sequences respectively corresponding to actions suggested to a user recipient of the SMS message for further processing according to the present subject disclosure.

In the above-described embodiments in which the structure of the SMS message is as illustrated on FIG. 3a (characters (51) to be interpreted as standard text content in the first part of the message, and predefined character pattern (52) followed by one or several character sequences (53) respectively corresponding to actions responsive to the SMS message suggested to a user recipient of the SMS message at the end of the SMS message), the processing may proceed, after identification of the predefined character pattern, with processing of the one or several character sequences (53) respectively corresponding to actions responsive to the SMS message which can be in such case assumed to run, in the character sequence of the SMS message, from the first character following the predefined character pattern to the last character of the SMS message. The processing of the one or several character sequences (53) may include interpreting such one or several character sequences for restituting them on a user interface of the recipient device (e.g. a mobile station as described above).

Figure 3B:
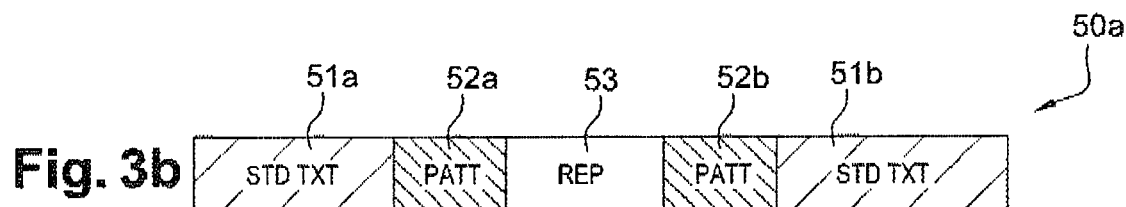

Referring to FIG. 3b, in other embodiments the SMS message may be generated so that it first contains a first set of one or several characters (51a) which are not to be interpreted according to the present subject disclosure (e.g. corresponding to standard text content), followed by a first predefined character pattern (52a) which is itself followed by one or several character sequences (53) respectively corresponding to actions responsive to the SMS message suggested to a user recipient of the SMS message, followed by a second predefined character pattern (52b) with at the end of the message a second set of one or several characters (51b) which are also not to be interpreted according to the present subject disclosure (e.g. corresponding to standard text content). In such cases the processing of the received SMS message at the receiving end (for example a mobile station) may include identifying the first and second predefined pattern, so as to identify the one or several character sequences respectively corresponding to actions (e.g. replies) suggested to a user recipient of the SMS message for further processing according to the present subject disclosure. As described above in relation to an SMS message with one predefined character pattern, each of the first and second predefined character patterns may serve to flag or mark a boundary of the set of characters included in the SMS message which are to be interpreted according to the present subject disclosure, which set comprises one or several character sequences respectively corresponding to actions (e.g. replies) suggested to a user recipient of the SMS message.

Depending on the embodiment, the first and second predefined patterns may be chosen with more or less similarities (identical or not, having a same length, with one character in common, etc.). In embodiments where the first and second predefined patterns are not identical, each of the first and second predefined patterns will be preferably known to the recipient device before reception of the SMS message. Also depending on whether the first and second predefined patterns will be chosen identical, the processing at the recipient device will involve identifying in the received message different predefined character patterns, or several instances of the same predefined character pattern.

At the recipient end, the processing of a received SMS message may proceed through the characters of the received message to identify a first predefined character pattern or, depending on the embodiment, a first instance of a predefined character pattern. Upon identification of a first predefined character pattern or, depending on the embodiment, a first instance of a predefined character pattern, the processing may continue to test the content of the received SMS message in a search for a second predefined character pattern different from the first predefined character pattern, or a second instance of the same predefined character pattern.

Upon identifying a second predefined character pattern different from the first predefined character pattern, or a second instance of the same predefined character pattern, the processing may proceed with further processing pursuant to the present subject disclosure of the set of characters in-between the first and second predefined character patterns or, as the case may be, the first and second instances of the same predefined character pattern.

In the case where no second predefined character pattern different from the first predefined character pattern, or depending on the embodiment, no second instance of the same predefined character pattern, can be identified in the received message, the recipient device may be configured for assuming that the received SMS comprises only one predefined character pattern and has a structure corresponding to the above-described structure illustrated on FIG. 3a. That is, assuming that the received SMS comprises only one predefined character pattern, that all characters located before the predefined character pattern may not be subjected to any further processing according to the present subject disclosure, and that all characters located after the predefined character pattern may be subjected to some further processing according to the present subject disclosure.

Coming back to FIG. 2, the server messaging engine 152 may be, in one or more embodiments, configured to generate a concatenated text message corresponding to a sequence of two or more SMS messages. The generation of the sequence of two or more SMS messages may be configured so that only one SMS message of the sequence comprises characters to be interpreted according to the present subject disclosure, including at least a predefined character pattern followed by one or several character sequences respectively corresponding to actions responsive to one or several SMS messages of the sequence suggested to a user recipient of the sequence of SMS messages. That is, other messages of the sequence may not comprise characters to be interpreted according to the present subject disclosure.

In one or more embodiments, the sequence of SMS messages may be generated so that the only one SMS message of the sequence that comprises characters to be interpreted according to the present subject disclosure is the last SMS message of the sequence. In such case, only the last, that is, final, SMS message of the concatenated message will comprise characters to be interpreted according to the present subject disclosure.

As described above with respect to the generation of one SMS message comprising characters to be interpreted according to the present subject disclosure, the only SMS message of the sequence comprising characters to be interpreted according to the present subject disclosure may include one or more predefined character patterns to be used for the identification, at the receiver of such message, of a set of characters to be interpreted according to the present subject disclosure, for example through parsing such only SMS message to identify, including locate, the one or more predefined character patterns.

In one or more embodiments, the only SMS message of the sequence comprising characters to be interpreted according to the present subject disclosure may also comprise characters not to be interpreted according to the present subject disclosure (e.g. characters to be interpreted as standard text content), and have a structure similar to one of the structures described above and illustrated on FIGS. 3a and 3b.

Figure 3C:
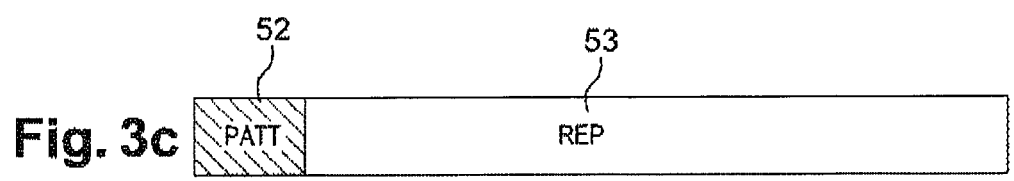

Alternatively, the only SMS message of the sequence comprising characters to be interpreted according to the present subject disclosure may be generated so that it does not comprise any character not to be interpreted according to the present subject disclosure, as illustrated on FIG. 3c which shows an SMS message that comprises as first characters a predefined character pattern (52) followed by one or several character sequences (53) respectively corresponding to actions (e.g. replies) suggested to a user recipient of the sequence of SMS messages. In such case, the other SMS messages of the sequence may only comprise characters not to be interpreted according to the present subject disclosure, while the only SMS message of the sequence comprising characters to be interpreted according to the present subject disclosure may only comprise such characters.

Advantageously, in one or more embodiments, the sequence of SMS messages may be generated so that the only SMS message of the sequence comprising characters to be interpreted according to the present subject disclosure does not comprise any character not to be interpreted according to the present subject disclosure, and is the last SMS message of the sequence. The processing time for identification at the receiver end that the sequence of SMS messages contains characters that are to be interpreted according to the present subject disclosure may indeed be reduced if the receiver knows that only the last SMS of the sequence needs to be searched for characters to be interpreted according to the present subject disclosure. Such processing time at the receiver end may even further be reduced if the receiver knows that the search for characters to be interpreted according to the present subject disclosure may be limited to a search for a predefined character pattern located at the beginning of the last SMS message. In addition, a predefined character pattern located at the beginning of the last SMS message is, regardless or not of the uniqueness of the chosen predefined character pattern as discussed above, much less likely to occur randomly in normal person-to-person communication and so less likely to be triggered accidentally.

For example, a messaging client at a recipient device may be configured to identify that the final SMS message of a received sequence of SMS messages contains suggested actions characters by looking for a predefined character pattern on the first line of the final SMS message. The interpretation of the set of one or several character sequences respectively corresponding to actions (e.g. replies) suggested to a user recipient of the sequence of SMS messages may also advantageously be simplified if the receiver knows that all characters that follow the identified character pattern correspond to one of those character sequences.

In one or more embodiment, the predefined character pattern marking the beginning of the suggested actions sequences may be followed by a text to be restituted on a user interface of the recipient user device, followed itself by another predefined character pattern, possibly identical or similar to the one preceding the text, in order to mark the beginning of the one or more character sequences respectively corresponding to suggested actions.

For example, the following concatenation of P SMS messages may be generated and sent to recipient(s):

| SMS(#1):    | <SMS text up to 160 characters> |
| SMS(#2):    | <SMS text up to 160 characters> |
| (. . .)     | |
| SMS(#P-1):  | <SMS text up to 160 characters> |
| SMS(#P):    | <predefined character pattern1><action prompt text><predefined character pattern2><suggested action character sequence 1><suggested action character sequence 2>(. . .)<suggested action character sequence N-1><suggested action character sequence N>. |

In this example and the following ones, P may be equal to any natural integer, and in the cases where P is equal to 1, the last (that is, $P^{th}$) SMS of the exemplary sequence is generated and sent to recipient(s) according to the present subject disclosure. N is also a natural integer, greater or equal to 1.

In some embodiments, each of the one or several character sequences respectively corresponding to a suggested action may be followed by a separation character, such as a carriage return or line break character, so as to mark the end of the character sequence and separate it from a following character sequence, as the case may be.

In such embodiments, the following concatenation of P SMS messages may for example be generated and sent to recipients:

| SMS(#1):    | <SMS text up to 160 characters> |
| SMS(#2):    | <SMS text up to 160 characters> |
| (. . .)     | |
| SMS(#P-1):  | <SMS text up to 160 characters> |
| SMS(#P):    | <predefined character pattern1><action prompt text><predefined character pattern2><suggested action character sequence 1><br> |
| | <suggested action character sequence 2><br> |
| | (. . .) |
| | <suggested action character sequence N-1><br> |
| | <suggested action character sequence N><br>. |

In the case where the first predefined character pattern corresponds to two semicolon characters immediately following each other, and the second predefined character pattern corresponds to the first predefined character pattern followed by a carriage return/line break character, the concatenation of two SMS messages may be as follows:

| SMS(#1):    | <SMS text up to 160 characters> |
| SMS(#2):    | <SMS text up to 160 characters> |
| (. . .)     | |
| SMS(#P-1):  | <SMS text up to 160 characters> |
| SMS(#P):    | <;;><action prompt text><;;><br> |
| | <suggested action character sequence 1><br> |
| | <suggested action character sequence 2><br> |
| | (. . .) |
| | <suggested action character sequence N-1><br> |
| | <suggested action character sequence N><br>. |

In one or more embodiments, the suggested action section of the generated SMS message may further comprise a user interface command for restituting respective portions of the one or several character sequences on a user interface of a user recipient device.

Depending on the embodiment, the user interface command may be a separate command included in the content of the suggested action section of the SMS message, for instance specific to each of the one or several character sequences respectively corresponding to suggested actions, or may correspond to a predefined character pattern included in the suggested action section.

The use of a separate user interface command included in the suggested action section advantageously allows controlling (and therefore varying depending on the needs) the type of command applicable to all of the one or several character sequences respectively corresponding to suggested actions that follows the command.

Taking back the previous example, a concatenation of P SMS messages using such embodiment may be as follows:

| SMS(#1):    | <SMS text up to 160 characters> |
| SMS(#2):    | <SMS text up to 160 characters> |
| (. . .)     | |
| SMS(#P-1):  | <SMS text up to 160 characters> |
| SMS(#P):    | <predefined character pattern 1><action prompt text><predefined character pattern 2> |
| | <user interface command><br> |
| | <suggested action character sequence 1><br> |
| | <suggested action character sequence 2><br> |
| | (. . .) |
| | <suggested action character sequence N-1><br> |
| | <suggested action character sequence N><br>. |

As mentioned above, the suggested action section may in another embodiment include a separate user interface command specific to each of the one or several character sequences respectively corresponding to suggested actions. In such cases each separate user interface command may be comprised in the corresponding character sequences, and be directed to another portion of the same character sequence.

The exemplary concatenation of P SMS messages may then be as follows:

| SMS(#1):    | <SMS text up to 160 characters> |
| SMS(#2):    | <SMS text up to 160 characters> |
| (. . .)     | |
| SMS(#P-1):  | <SMS text up to 160 characters> |
| SMS(#P):    | <predefined character pattern 1><action prompt text><predefined character pattern 2> |
| | <user interface command1><br> |
| | <suggested action character sequence 1><br> |
| | <user interface command2><br> |
| | <suggested action character sequence 2><br> |

-continued

```
(. . .)
<user interface commandN-1><br>
<suggested action character sequence N-1><br>
<user interface commandN><br>
<suggested action character sequence N><br>.
```

This advantageously allows defining and using a specific user interface command for each of the suggested actions, which may be of different types, for restituting in each case all or a portion of the suggested action character sequence in a corresponding manner. For example, one or several suggested actions may be suggested replies, while other suggested actions may be user commands for executing applications other than sending SMS messages, e.g. sending text messages other than SMS messages, executing a Web browser on the recipient device to display or interact with web content, etc.

In other embodiments, no separate user interface command may be used, and the recipient user device may be configured to process the suggested action section and interpret a predefined character pattern comprised therein as a user interface command for restituting respective portions of the one or several character sequences on a user interface of the device. In such cases, the respective portions of the character sequences to be restituted under the command may correspond to the entirety of each corresponding character sequence.

For example, in the above-mentioned example reproduced below, the concatenation of P SMS messages may be generated and sent to recipients configured to interpret the "predefined character pattern 1" as a user interface command (besides its use and interpretation as boundary of the suggested action section), interpret the "predefined character pattern 2" as a user interface command, or interpret a combination of the "predefined character pattern 1" and the "predefined character pattern 2" as a user interface command:

```
SMS(#1):      <SMS text up to 160 characters>
SMS(#2):      <SMS text up to 160 characters>
(. . .)
SMS(#P-1):    <SMS text up to 160 characters>
SMS(#P):      <predefined character pattern1><action prompt
text><predefined character pattern2>
              <suggested action character sequence 1><br>
              <suggested action character sequence 2><br>
              (. . .)
              <suggested action character sequence N-1><br>
              <suggested action character sequence N><br>.
```

In one or more embodiments where the user recipient device is configured with a user interface display, such as, for instance a screen, or a touchscreen, for restituting a graphical user interface (GUI) on the display, the user interface command may be a display command for restituting the respective portions of the one or several character sequences on the graphical user interface in association with respective buttons displayed on the graphical user interface In one or more embodiments, the user interface command may then comprise a display command for restituting the respective portions of the one or several character sequences on a graphical user interface of the user recipient device in association with respective buttons comprised in the graphical user interface displayed on a touch sensitive display device of the user recipient device.

For example, the user interface command comprised in the suggested action section may be defined so that it is interpreted, at a recipient user device in receipt of the SMS message comprising the suggested action section, as a command to generate a graphical user interface comprising at least a portion corresponding to the suggested action section, to be displayed on a display of the user recipient device.

Depending on the embodiment, the suggested actions may be suggested replies, user commands for executing applications other than sending SMS messages, e.g. sending text messages other than SMS messages, executing a Web browser on the recipient device to display or interact with web content, etc., or a combination thereof. A suggested action may be specific to a character sequence with which it is associated, so that different suggested actions may be respectively associated with character sequences. In other embodiments, all of the suggested actions may be suggested replies, that is, may suggest to the recipient user the sending of a message, e.g. a SMS message, which includes the corresponding character sequence, as a reply to the received at least one SMS message.

In one or more embodiments, all or portions of the one or several character sequences respectively corresponding to suggested actions may advantageously be displayed in association with respective buttons comprised in the generated graphical user interface. In one or more embodiments, each button may be displayed on a touch sensitive display device (e.g. a touchscreen) of the user recipient device with respective character sequences corresponding to suggested actions (e.g. suggested replies).

For example, in embodiments wherein no separate user interface command may be used, a recipient user device comprising a touch sensitive display device may be configured to process the suggested action section and interpret a predefined character pattern comprised therein as a graphical user interface command for generating a graphical user interface that includes respective portions of the one or several character sequences associated with respective buttons to be displayed on the touch sensitive display device.

Coming back to the previous exemplary concatenated SMS messages, the following concatenation of P SMS messages may be generated and sent to recipients configured to interpret the "predefined character pattern 1" and/or the "predefined character pattern 2" as a graphical user interface command to generate a graphical user interface that includes a button for, and associated with in the graphical user interface, each suggested action (in this example a suggested reply) character sequence:

```
SMS(#1):      <SMS text up to 160 characters>
SMS(#2):      <SMS text up to 160 characters>
(. . .)
SMS(#P-1):    <SMS text up to 160 characters>
SMS(#P):      <predefined character pattern1><action prompt
text><predefined character pattern2>
              <"suggested reply character sequence 1" button
#1><br>
              <"suggested reply character sequence 2" button
#2><br>
              (. . .)
              <"suggested reply character sequence N-1" button
#N-1><br>
              <"suggested reply character sequence N" button
#N><br>.
```

According to a different example, the following concatenation of P SMS messages may be generated and sent to recipients configured to interpret the "predefined character pattern 1" and/or the "predefined character pattern 2" as a graphical user interface command to generate a graphical user interface that includes a button for, and associated with in the graphical user interface, each suggested action (in this example a suggested browsing using a Web browser) character sequence:

| | |
|---|---|
| SMS(#1): | <SMS text up to 160 characters> |
| SMS(#2): | <SMS text up to 160 characters> |
| (. . .) | |
| SMS(#P-1): | <SMS text up to 160 characters> |
| SMS(#P): | <predefined character pattern1><action prompt text><predefined character pattern2> |
| | <"suggested browsing character sequence 1(Uniform Resource Locator 1)" button #1><br> |
| | <"suggested browsing character sequence 2(URL 2)" button #2><br> |
| | (. . .) |
| | <"suggested browsing character sequence N-1 (URL #N-1)" button #N-1><br> |
| | <"suggested browsing character sequence N (URL #N)" button #N><br>. |

In yet another, different example, the following concatenation of P SMS messages may be generated and sent to recipients configured to interpret the "predefined character pattern 1" and/or the "predefined character pattern 2" as a graphical user interface command to generate a graphical user interface that includes a button for, and associated with in the graphical user interface, each suggested action (in this example a combination of suggested replies and suggested browsing using a Web browser) character sequence. Depending on the embodiment, the type of action corresponding to each suggested action may be encoded in the associated suggested action character sequence, or the combination of actions of different types may be encoded in the "predefined character pattern 1" and/or the "predefined character pattern 2":

| | |
|---|---|
| SMS(#1): | <SMS text up to 160 characters> |
| SMS(#2): | <SMS text up to 160 characters> |
| (. . .) | |
| SMS(#P-1): | <SMS text up to 160 characters> |
| SMS(#P): | <predefined character pattern1><action prompt text><predefined character pattern2> |
| | <"suggested reply character sequence 1" button #1><br> |
| | <"suggested browsing character sequence 2(URL 2)" button #2><br> |
| | (. . .) |
| | <"suggested reply character sequence N-1" button #N-1><br> |
| | <"suggested browsing character sequence N (URL #N)" button #N><br>. |

The use of a button associated with a suggested reply advantageously simplifies the input of a response by a user recipient of the SMS message comprising the suggested reply section, as the user recipient device may be configured to send an SMS comprising the text of the suggested reply upon detecting a touch event on the touch sensitive display device of the user recipient device, which touch event corresponds to the user pressing on the button. For this reason the buttons can be considered as "one touch reply" buttons.

In some embodiments, the user recipient device can then be configured to process a received SMS message comprising a suggested action section including identifying in the suggested action section one or several character sequences respectively corresponding to suggested actions, generating a graphical user interface comprising one or several "one touch reply" buttons on which is included the content of respective character sequences respectively corresponding to suggested actions, and displaying such graphical user interface on a touch-sensitive display device. Any standard characters, or non-standard characters (in particular directed to the cases where a graphical user interface is used at the recipient device), such as for example emoticons, may be used in the one or several character sequences respectively corresponding to replies.

For example, if an SMS campaign targeting customers of an energy provider company is designed to explain a specific offer from the company, it may use the following concatenation of two SMS messages:

| | |
|---|---|
| SMS(#1): | Your fixed rate is about to expire. Company_Name has a new range of competitive fixed rate tariffs for 1, 2, and 3 years. |
| SMS(#2): | ;;To find out more reply;;<br> |
| | One Year Fixed<br> |
| | Two Year fixed<br> |
| | Three Year Fixed<br> |
| | Remind Me Later<br> |
| | Not Interested<br> |

In another example, where the received SMS messages are interpreted as including a command for specific tasks, at least some of which not involving sending a reply to the sender, one of the suggested action may include the following character sequence: "Track your package: www.myparcel.com/refdigitsofmy parcel#". The recipient device may convert this character sequence to a button in a GUI displayed on a screen device with the following label: "Track your package", and if selected by the user would launch a browser to the URL provided in the suggested action section in association with the suggested action "Track your package".

Figure 4:
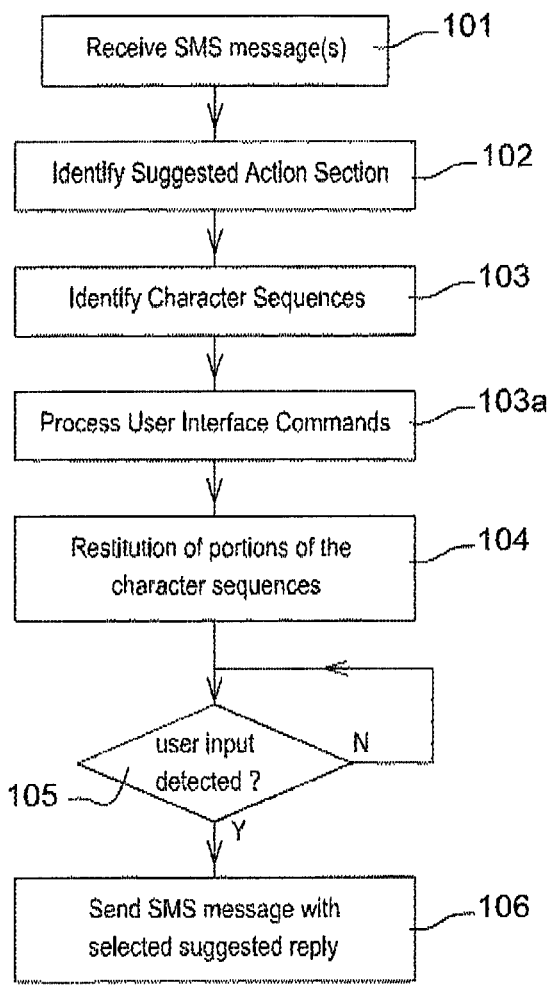
FIG. 4 is a flow diagram illustrating an exemplary embodiment of the proposed process for receiving SMS messages.

FIG. 4 illustrates a proposed process (100) for processing a received SMS at a recipient device according to one or more embodiments.

The proposed process may be performed by a messaging client of a recipient user device configured according to embodiments of the present subject disclosure, upon receiving (101) at least one SMS message.

One of the received one or more SMS messages may include a suggested action section comprising a predefined character pattern followed by one or several character sequences respectively corresponding to actions responsive to the received at least one SMS message suggested to a user recipient of the at least one SMS message.

The processing of the received SMS message proceeds to identifying (101) in the received at least one SMS messages the suggested action section, based on the predefined character pattern. As discussed above, the received SMS may be configured according to embodiments of the present subject disclosure with one or more predefined character patterns which may serve as boundary markers for the suggested action sections, in order to distinguish the content of the received SMS message which may be interpreted according to the present subject disclosure from the content which may not be.

Once a suggested action section has been identified in the received SMS message, the suggested action section is itself processed in order to identify (103) the one or several character sequences comprised therein.

For example, the processing of the suggested action section may include parsing the section in order to identify and extract therefrom the character sequences that respectively correspond to suggested actions responsive to the received SMS.

Once the suggested action character sequences have been identified, they are restituted (104) on a user interface of the recipient user device.

In embodiments where the user interface includes only an audio interface (for example, a loudspeaker and a driver), the suggested action character sequences may be restituted on the audio interface through a speech synthesis function implemented on the recipient user device.

In one or more embodiments, the restitution of suggested action character sequences may be performed further to the identification and processing (103a) in the suggested action section of one or more user interface commands for restituting respective portions of the one or several character sequences on the user interface. In such cases the restitution may further comprise restituting the respective portions on the user interface according to the user interface command.

As described above, depending on the embodiment, the user interface commands may be separate, in the content of the suggested action section of the SMS message, from any predefined character pattern comprised in the suggested action section (for instance be specific to each of the one or several character sequences respectively corresponding to suggested actions), or may correspond to a predefined character pattern included in the suggested action section.

Therefore in some embodiments, no separate user interface command may be used, and the recipient user device may be configured to process the suggested action section and interpret a predefined character pattern comprised therein as a user interface command for restituting respective portions of the one or several character sequences on a user interface of the device. In such cases, the respective portions of the character sequences to be restituted under the command may correspond to the entirety of each corresponding character sequence, and the identification of the user interface command(s) may be performed independently from the identification of the character sequences.

In other embodiments, the user interface command(s) may be separate and associated, globally or respectively, with the character sequences, in which cases the identification of the user interface command(s) may need to be performed after the identification of the character sequences.

In embodiments where each of the user interface command(s) comprises a command for generating or updating a graphical user interface comprising the respective portions of the one or several character sequences in association with respective buttons to be displayed on a touch sensitive display device of the user recipient device, the processing of the received user interface command(s) proceed with generation of such a graphical user interface, and the restituting (104) comprises displaying on the touch sensitive display device the graphical user interface, that is, at least the portions of the one or several character sequences in association with their corresponding buttons.

Depending on the embodiment, the received SMS message(s) may be a single SMS message, or may comprise a sequence of at least two SMS messages, with varying structure as described above with reference to FIGS. 3a, 3b, and 3c. The proposed process for receiving SMS messages may be adapted accordingly with respect to the identification of the suggested action section, for example through parsing only the first line of the last received SMS message of a sequence of concatenated SMS messages.

In embodiments where the received at least one SMS message comprises a sequence of at least two SMS messages, wherein the last SMS message of the sequence comprises the suggested action section comprising the predefined character pattern followed by the one or several character sequences, the identifying of the suggested action section based on the predefined character pattern may comprise identifying the suggested action section in the last SMS message of the sequence.

In some embodiments, the predefined character pattern may comprise a second predefined character preceded by a first predefined character, and the first and second predefined characters may be separated by an action prompt text (e.g. a response prompt text). In such cases, the proposed process for receiving SMS messages may include a processing of the predefined character pattern in order to identify its structure, and extract and process the action prompt text, for example through update of a graphical user interface to be displayed on a touch sensitive display device so that the action prompt text is displayed in association with the suggested actions.

In embodiments where the recipient user device is equipped with a touch sensitive display device, the proposed method for receiving SMS messages may further comprise a user input detection loop (105) for detecting any user input received, for example corresponding to depressing one of the displayed buttons on the display device. Upon receiving such a user input on the touch sensitive display, an action corresponding to the user input may be triggered. In cases where the suggested action is a response to the received SMS message(s), an SMS message, comprising the suggested reply displayed on the depressed button and selected by the user, may be generated and sent (106) as a reply to the received SMS message comprising the suggested action section.

Figure 5:
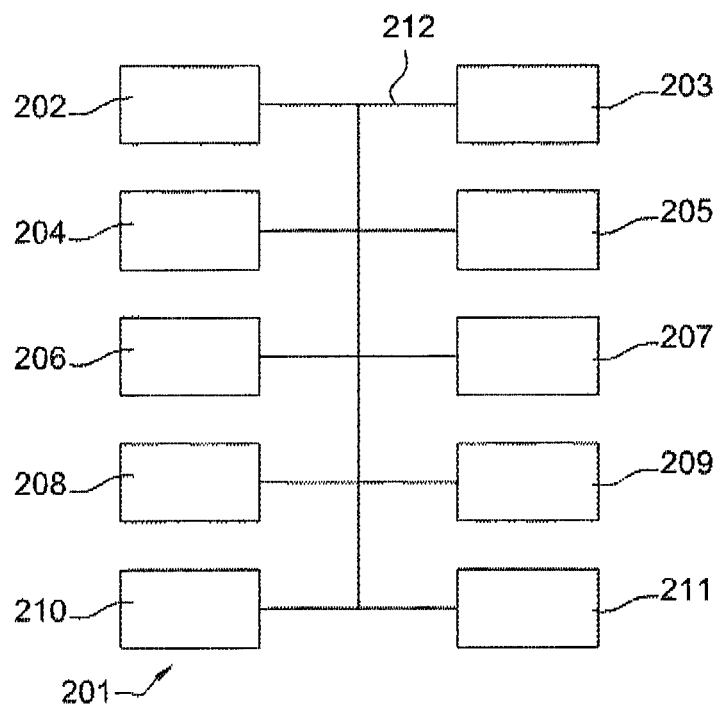
FIG. 5 is a block diagram illustrating an exemplary architecture of a communication device suitable for use according to one or several embodiments.

FIG. 5 shows an exemplary architecture of a communication device 201 suitable for use according to one or several embodiments.

The communication device 201 is an electronic device which may include circuitry for performing the main functions of a mobile phone (such as a mobile smartphone), a tablet computer, a laptop computer, a gaming console, a set-top-box, a personal computer, a wearable computing device, or the like.

In one or more embodiments, the communication device 201 may include one or more antennas 202, one or more transceiver units 203 for the transmission and reception of wireless signals, an output unit 204 that includes hardware such as an audio unit, a microphone, and/or a display screen, a clock unit 205, a power source unit 206 (e.g., battery, solar panel, wired power connection), a memory unit 207, an input unit 208 that includes hardware such as a keypad or touchscreen for receiving a user input, a mobile positioning unit, such as a GPS unit, for indicating the geographical location of the device 201, a communication bus 212, a communication application unit 210, an operating system (OS) unit 211, and a processor 209. Some output hardware 204 such as a display screen may include a touch sensitive screen (also referred to herein as a "touchscreen"). Accordingly, some output hardware 204 may provide input functionality and some input hardware 208 may provide output functionality. The memory 207 may include one or more memory circuits including non-volatile memory circuits (e.g., EEPROM, FLASH, etc.).

In the exemplary architecture illustrated on FIG. 4, all of the one or more antennas 202, one or more transceiver units 203, output unit 204, clock unit 205, power source unit 206, memory unit 207, input unit 208, processor 209, communication application unit 210, and OS unit 211 are operatively coupled with one another through the communication bus 212.

The one or more transceiver units 203 may each be configured for the transmission and reception of wireless signals corresponding to one or several wireless radio-communication system or standard, such as, without limitation, cellular wireless signals (e.g. GSM, GPRS, EDGE, CDMA, UMTS, LTE, and LTE-A), WiFi, WiMAX, Bluetooth, ZigBee, and the likes.

Depending on the embodiment, the processor 209 may be any suitable microprocessor, microcontroller, Field Programmable Gate Arrays (FPGA), Application Specific Integrated Circuits (ASIC), Digital Signal Processing chip, and/or state machine, or a combination thereof. The processor 209 may also be operatively coupled with non-transitory computer-readable storage media, such as, without limitation, the memory 207, capable of storing computer-readable program instructions or software code that, when executed by the processor 209, cause the communication device 201 to perform the functions described herein.

Depending on the capabilities of the communication device 201, and on the supporting telecommunication networks, the communication device 201 may also be configured to provide a range of voice and data communication services. As non-limiting examples the communication device 201 may be configured to provide telephone network based communication services including voice, multimedia and text messaging, as well as other data exchange capabilities, enabling Internet access and email exchange, for example.

In one or more embodiments, the communication device 201 may be configured to exchange SMS messages via one or several networks with remote servers, such as the SME entity 15 illustrated on FIG. 1.

The communication device 201 will also typically be provided with an operating system 211 that includes computer-executable program instructions for the general management of the device 201, possibly with additional operation management functions depending on the features provided in the device 201. In embodiments where the device 201 is a mobile device, the operating system 211 of the device 201 may be configured as a mobile operating system, with additional management functions related to mobile features of the device 201, such as the transmission and reception of wireless signals, the GPS mobile navigation feature, etc.

In one or more embodiments, the communication device 201 may be operable to have one or more messaging client applications 210 (for text messages, e.g. SMS messages communications) or widgets installed, such as, but not limited to, dialer applications, messaging applications, social networking applications, and/or email applications, for example, for providing voice and data communications services. Each application or widget installed on the communication device 201 may have an associated graphical user interface.

Depending on the embodiment, parts or all of communications services featured in the communication device 201 may be provided for by the operating system 211 embedded in the communication device 201. For example, the OS 211 running on the device 201 may be configured to provide communication features such as control plane and/or data plane layer functions, such as, for example, as described by the OSI layer model. A communication application installed in the communication device 201 may then be configured to provide a complementary portion of control plane and/or data plane layer functions (e.g. and applicative layer function), and include an interface for exchanging data with the OS 211 of the device 201 for providing communication services.

In one or more embodiments, the OS 211 of the device 201 may be configured as an event-driven system that executes software code upon occurrence of respective predefined events (such as, without limitations, reception of one or several SMS messages), so that reception of one or several SMS messages triggers an interrupt at the OS level, and generates a call from the OS 211 to the messaging client application 210 to hand over data associated with the received SMS message(s). In other embodiments, the OS 211 may indicate to the application 210 that data associated with received SMS message(s) is available in memory 207.

The messaging client application 210 installed on the device 201 may be configured to process received SMS messages according to embodiments of the proposed process described herein.

In one or more embodiments, the messaging client application 210 may be configured to receive at least one SMS message, wherein the at least one SMS message comprises a suggested action section comprising a predefined character pattern followed by one or several character sequences respectively corresponding to actions (e.g. replies) responsive to the received at least one SMS message suggested to a user recipient of the at least one SMS message, identify in the at least one SMS messages the suggested action section, based on the predefined character pattern, identify in the suggested action section the one or several character sequences, and restitute on a user interface the one or several character sequences according to the present subject disclosure.

FIGS. 6a, 6b, 6c and 6d show exemplary GUI displays reporting exemplary suggested action sections according to one or more embodiments.

Figure 6A:
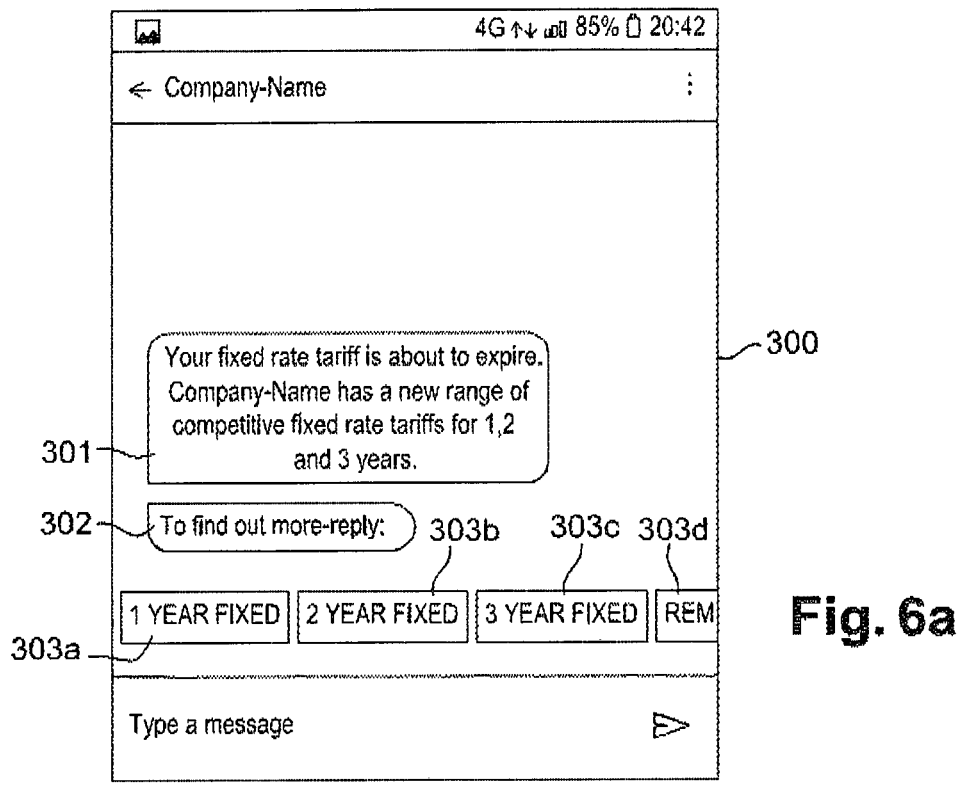
FIGS. 6a, 6b, 6c, and 6d show exemplary GUI displays reporting exemplary suggested action sections according to one or more embodiments.
Figure 6B:
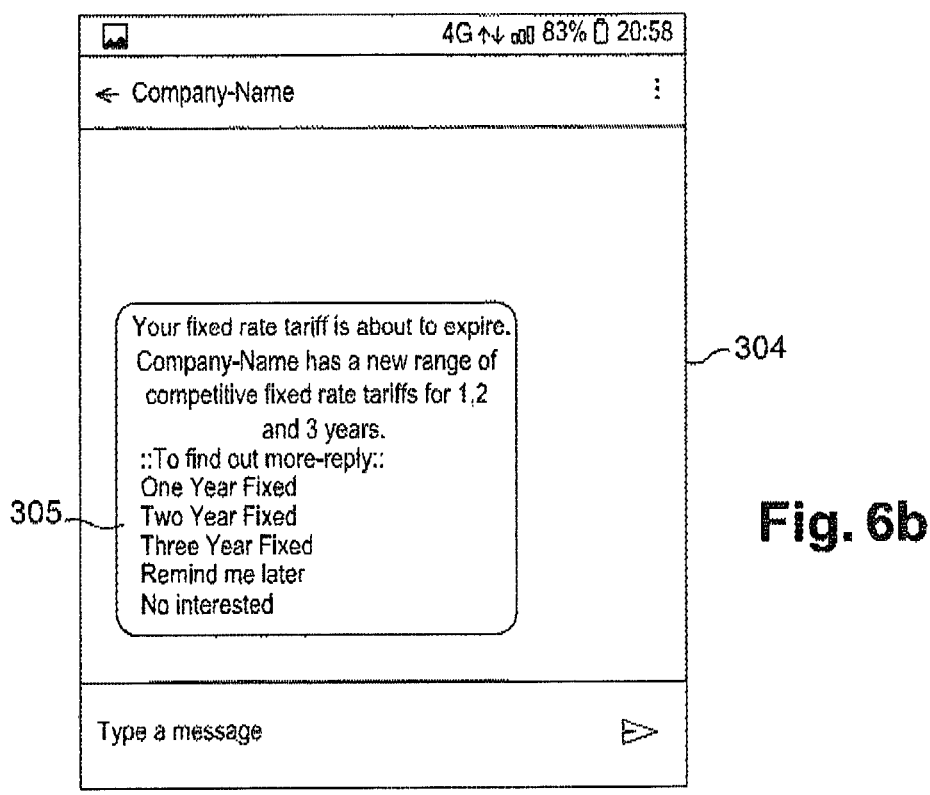

FIGS. 6a and 6b show exemplary GUI displays of a user device (e.g. a touchscreen of a smartphone device) in receipt of SMS messages according to the present subject disclosure in cases corresponding to the above described exemplary concatenation of two SMS messages for an SMS campaign targeting customers of an energy provider company.

FIG. 6a shows an exemplary GUI display 300 that includes a standard SMS message 301 ("Your fixed rate tariff is about to expire. Company_Name has a new range of competitive fixed rate tariffs for 1, 2 and 3 years."), followed by a SMS message according to the present subject disclosure. This second message includes a suggested reply section, that is, a suggested action section wherein suggested actions are of the reply type. The suggested action section has been processed by the recipient user device so that a response prompt text 302 ("To find out more—reply:") is displayed on the GUI 300, followed by four buttons 303a, 303b, 303c and 303d, each displayed with a label ("1 YEAR FIXED" for button 303a, "2 YEAR FIXED" for button 303b, "3 YEAR FIXED" for button 303c and "REMIND ME LATER" for button 303d) reporting a suggested reply corresponding to a character sequence comprised in the suggested action section. As described above, the user device may be configured so that a user input on one of the displayed buttons 303a, 303b, 303c and 303d triggers the generation and sending of an SMS message to the sender (in this example a SMS number associated with "Company_Name") as response to the received SMS messages, which SMS message includes in its payload the label of the button selected by the user input.

FIG. 6b shows an exemplary GUI display 304 that corresponds to the same example, however in a case where the recipient device is not configured for interpreting and executing display commands comprised in the received SMS messages. The GUI display 304 comprises a single received SMS message display 305, whose content includes predefined character patterns (in this example, "::") used in the suggested action section comprised in the received SMS messages. There is no display of buttons on the GUI 304, yet the suggested replies are still intelligible to a user. As discussed above, the predefined character patterns may be chosen in anticipation of this case where the recipient device is not configured for interpreting and executing display commands comprised in the received SMS messages, so that the message may still be meaningfully displayed, as is the case with the GUI display 304.

Figure 6C:
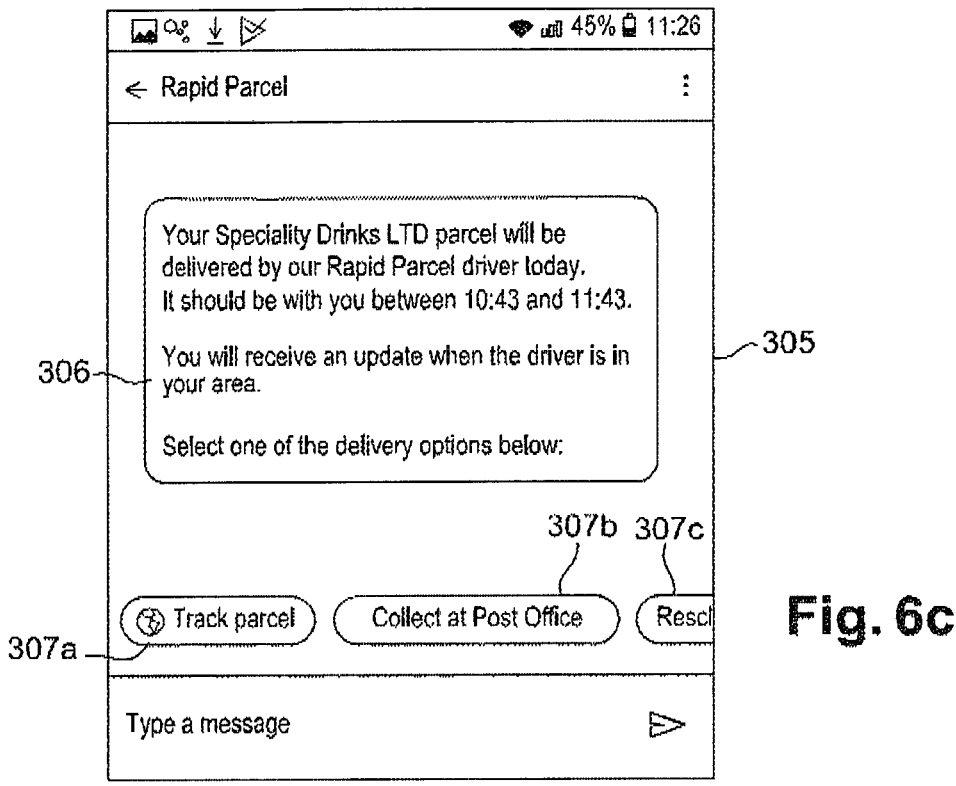

FIG. 6c shows an exemplary GUI display 305 that includes a standard text SMS message 306 ("Your Speciality Drinks LTD parcel will be delivered by our Rapid Parcel driver today. It should be with you between 10:43 and 11:43. You will receive an update when the driver is in your area."), which is followed by an action prompt text message according to the present subject disclosure: "Select one of the delivery options below:"). This second portion of the text is part of a suggested action section that includes suggested actions of different types. The suggested action section has been processed by the recipient user device so that the action prompt text ("Select one of the delivery options below:") is displayed on the GUI 306, followed by three buttons 307a, 307b, and 307c, each displayed with a label ("Track parcel" for button 307a, "Collect at Post Office" for button 307b, and "Reschedule" for button 307d) reporting a suggested action corresponding to a character sequence comprised in the suggested action section. The GUI displayed on the user device screen might be updated to show a fourth button with a label "To neighbor" which is hidden in the GUI 306 shown on FIG. 6c. As described above, the user device may be configured so that a user input on the displayed buttons 307a (pressing button 307a) triggers the execution of a browser of the user device to fetch the data at the URL associated with the corresponding suggested action in the suggested action section, and that a user input on the buttons 307b, 307c and 307d triggers the generation and sending of an SMS message to the sender (in this example a SMS number associated with "Rapid Parcel") as response to the received SMS messages, which SMS message includes in its payload the label of the button selected by the user input ("Collect at Post Office" for button 307b, "Reschedule" for button 307c, and "To neighbour" for button 307d).

Figure 6D:
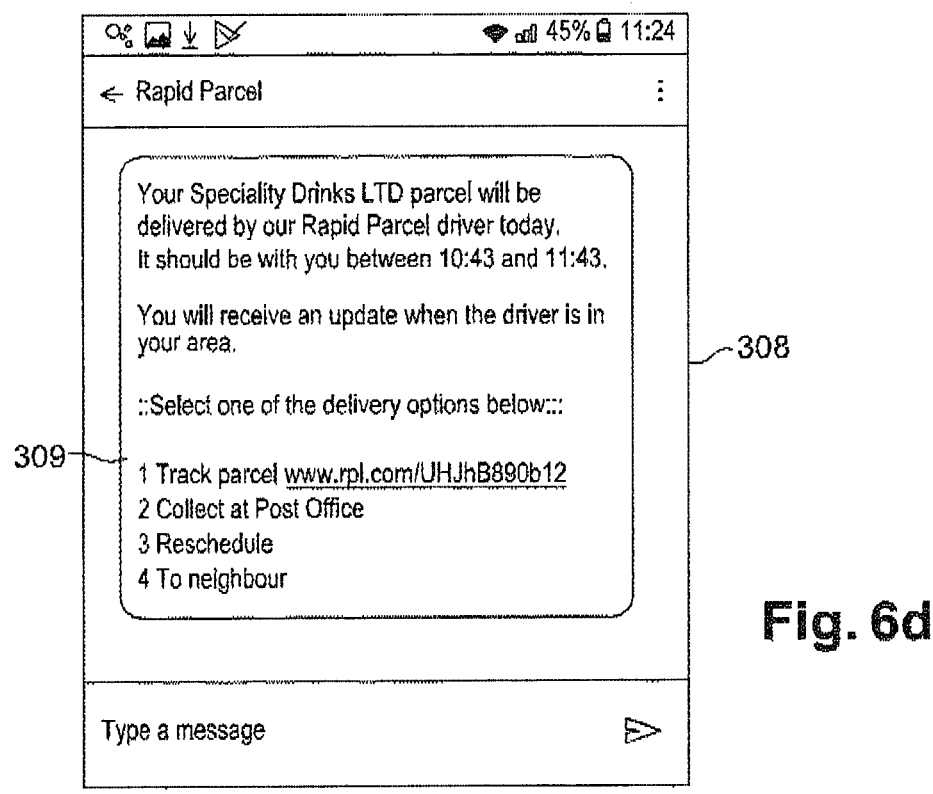

FIG. 6d shows an exemplary GUI display 308 that corresponds to the same example as in FIG. 6c, however (likewise the example of FIG. 6b) in a case where the recipient device is not configured for interpreting and executing display commands comprised in the received SMS messages. The GUI display 308 comprises a single received SMS text message display 309, whose content includes predefined character patterns (in this example, "::") used in the suggested action section comprised in the received SMS messages. There is no display of buttons on the GUI 308, yet the suggested actions are still intelligible to a user. As discussed above, the predefined character patterns may be chosen in anticipation of this case where the recipient device is not configured for interpreting and executing display commands comprised in the received SMS messages, so that the message may still be meaningfully displayed, as is the case with the GUI display 308.

In the example of FIGS. 6c and 6d, the choices shown on the GUI 309 on FIG. 6d are each indexed by a number which may be used by the user to respond to the received SMS, as relevant for the selected action. For example, the user may simply type and send the index "2" to indicate that she/he will collect the parcel at a post office, the index "3" to request that the delivery be rescheduled, or the index "4" to request that the parcel be presented to a neighbour. In one or more embodiments, the messaging client application installed on the recipient device may be configured to delete those indices from the corresponding character sequences, as is shown in FIG. 6C where none of the indices appear on the displayed buttons, as it may be considered, depending on the type of restitution of character sequences on a user interface of a recipient device, that these indices do not improve the user experience. Therefore, those indices, which may be useful to a user of a device which is not capable of interpreting received SMS messages according to the present subject disclosure as a short-cut simplifying the typing of the responses to the received messages, may be considered not useful for a device which is capable of interpreting received SMS messages according to the present subject disclosure so that such devices may be configured accordingly.

In one or more embodiments, SMS messages may be generated according to the present subject disclosure in a messaging server environment, for example configured to implement a SME function.

In one or several embodiments, the server environment may be a cloud-based environment.

In one or more embodiments, the server environment includes a messaging server configured for implementing the method proposed herein.

The messaging server may include a control engine, a messaging engine, a communication bus, a memory, and data storage. in embodiments, all of the control engine, messaging engine, memory, and data storage may be operatively coupled with one another through the communication bus.

In one or more embodiments, the messaging engine provides a messaging function configured for implementing the method proposed herein. To that end, messaging engine may include an Application Program Interface (API), for example in the form of computer-readable instructions stored in the memory which, when executed by a processor of the messaging server, provide an SMS generation function according to the present subject disclosure.

The control engine may include a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, the messaging server can be configured as a multiprocessor computer having multiple processors for providing parallel computing. The control engine may also comprise, or may be in communication with, computer storage media, such as, without limitation, the memory, capable of storing computer-readable program instructions or software code that, when executed by the processor(s), cause the messaging server to perform the functions described herein. The memory may be any type of non-transitory computer-readable storage medium coupled to the control engine.

The data storage may be any device or combination of devices configured for storing and retrieving data using data write and/or read operations, and may include one or several of a memory device, data farm, database, data storage medium, or a combination thereof.

It will be appreciated that the messaging server described above is provided by way of example only. Numerous other architectures, operating environments, and configurations are possible. Other embodiments of the messaging server may include fewer or greater number of components, and may incorporate some or all of the functionality described above.

The messaging server will typically include an operating system that provides computer-executable instructions or data structures which can be accessed by a processor of that server for the general operations of the server, such as data storage management, processing resource management, etc., and will include a non-transitory computer-readable storage device storing such computer-executable instructions or data structures.

It will be appreciated by those having ordinary skill in the relevant art that one or more components of the messaging server environment may be implemented as a virtual machine (VM) of a virtual environment running on a host computer system, the virtual environment comprising a management software, such as a hypervisor software, for managing hardware resources and virtual machines.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

As used herein, the term "message" encompasses a wide variety of formats for representing information for transmission. A message may include a machine readable aggregation of information such as an XML document, fixed field message, comma separated message, or the like. While recited in the singular, it will be understood that a message may be composed, transmitted, stored, and/or received in multiple parts.

As used herein an "interface" (e.g., graphical user interface) may include a web-based interface including data fields for receiving input signals or providing electronic information. The interface may be implemented in whole or in part using technologies such as HTML, Flash, Java, .net, web services, and RSS. In some implementations, the interface may be included in a stand-alone client (for example, thick client, fat client) configured to communicate in accordance with one or more of the aspects described.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, units, engines, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions, blocks, modules, units, engines, and circuits described herein may be implemented in hardware, software, firmware, or any combination thereof. If implemented in software, they may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

An exemplary aspect of the present disclosure provides a processor and a method to overcome disadvantages and/or make improvements over the prior art.

An exemplary aspect of the present disclosure provides a method for assisting users in interacting with message originator further to the reception of an A2P SMS message.

An exemplary aspect of the present disclosure provides a method for improving the user interaction with a message originator, be it another user or an application, upon receipt of an SMS message.

While the invention has been described with respect to preferred embodiments, those skilled in the art will readily appreciate that various changes and/or modifications can be made to the invention without departing from the scope of the invention as defined by the appended claims. In particular, the invention is not limited to specific embodiments regarding the client device or server environment and may be implemented using various architecture or components thereof without departing from its scope as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A computer-implemented method, comprising the following acts performed by a communication device:
   generating at least one SMS message, the generating comprising including in the at least one SMS message a suggested action section comprising a predefined character pattern followed by one or several character sequences respectively corresponding to actions responsive to the at least one SMS message suggested to a user recipient of the at least one SMS message, said at least one SMS message being intended for a recipient device with processing capabilities for interpreting said predefined character pattern, the predefined character pattern marking a boundary in the at least one SMS message of the suggested action section, the predefined character pattern being chosen sufficiently unique to enable use of the predefined character pattern, by the recipient device, to separate the suggested action section from other characters of said at least one SMS message; and
   sending the at least one SMS message to the recipient device.

2. The method according to claim 1, wherein the suggested action section further comprises a user interface command for restituting respective portions of the one or several character sequences on a user interface of a user recipient device.

3. The method according to claim 2, wherein the user interface command comprises a display command for restituting the respective portions of the one or several character sequences on a graphical user interface of the user recipient device in association with respective buttons comprised in the graphical user interface displayed on a touch sensitive display device of the user recipient device.

4. The method according to claim 1, wherein the generating at least one SMS message comprises generating a sequence of at least two SMS messages, wherein a last SMS message of the sequence comprises the suggested action section comprising the predefined character pattern followed by the one or several character sequences.

5. The method according to claim 1, wherein the predefined character pattern comprises a second predefined character preceded by a first predefined character, and wherein the first and second predefined characters are separated by an action prompt text.

6. The method according to claim 1, wherein at least one of the actions suggested to the user recipient is a reply to the at least one SMS message.

7. The computer-implemented method according to claim 1, further comprising sending the at least one SMS message from the communication device over a communication network.

8. A computer device, comprising:
   a processor,
   a non-transitory computer-readable memory operatively coupled to the processor, and
   a server messaging engine operatively coupled to the processor, wherein the processor is configured to control the server messaging engine to:
      generate at least one SMS message, the generating comprising including in the at least one SMS message a suggested action section comprising a predefined character pattern followed by one or several character sequences respectively corresponding to actions responsive to the at least one SMS message suggested to a user recipient of the at least one SMS message, said at least one SMS message being intended for a recipient device with processing capabilities for interpreting said predefined character pattern, the predefined character pattern marking a boundary in the at least one SMS message of the suggested action section, the predefined character pattern being chosen sufficiently unique to enable use of the predefined character pattern, by the recipient device, to separate the suggested action section from other characters of said at least one SMS message; and
      sending the at least one SMS message to the recipient device.

9. A method for receiving at least one SMS message, comprising the following acts performed by a communication device:

receiving the at least one SMS message, wherein the at least one SMS message comprises a suggested action section comprising a predefined character pattern followed by one or several character sequences respectively corresponding to actions responsive to the received at least one SMS message suggested to a user recipient of the at least one SMS message, the predefined character pattern marking a boundary in the at least one SMS message of the suggested action section, the predefined character pattern being sufficiently unique to enable the communication device to use the predefined character pattern to separate the suggested action section from other characters of said at least one SMS message;

interpreting the predefined character pattern;

identifying in the at least one SMS message the suggested action section, based on the interpretation of the predefined character pattern, by using the predefined character pattern to separate the suggested action section from the other characters of said at least one SMS message;

processing the identified suggested action section in order to identify in the identified suggested action section the one or several character sequences, based on the interpretation of the predefined character pattern and to extract from the identified suggested action section the identified one or several character sequences; and restituting on a user interface the one or several character sequences and at least one command corresponding to an action among actions responsive.

10. The method according to claim 9, wherein at least one of the actions suggested to the user recipient is a reply to the received at least one SMS message.

11. The method according to claim 9 wherein the suggested action section comprises a user interface command for restituting respective portions of the one or several character sequences on a user interface of the communication device, wherein the processing comprises identifying the user interface command in the identified suggested action section, and the restituting comprises, for each of the identified one or several character sequences, restituting the respective portions on the user interface according to the identified user interface command.

12. The method according to claim 11 wherein the user interface command comprises a command for generating a graphical user interface comprising the respective portions of the one or several character sequences in association with respective buttons to be displayed on a touch sensitive display device of the communication device, and wherein the restituting comprises displaying on the touch sensitive display device the portions of the one or several character sequences in association with their corresponding buttons of the graphical user interface.

13. The method according to claim 12, further comprising:

receiving a user input on the touch sensitive display device corresponding to depressing one of the displayed buttons, and generating an SMS message comprising the portion of the one or several character sequences displayed in association with the respective buttons.

14. The method according to claim 9, wherein the received at least one SMS message comprises a sequence of at least two SMS messages, wherein a last SMS message of the sequence comprises the suggested action section comprising the predefined character pattern followed by the one or several character sequences, and wherein the identifying the suggested action section based on the predefined character pattern comprises identifying the suggested action section in the last SMS message of the sequence.

15. The method according to claim 9, wherein the predefined character pattern comprises a second predefined character preceded by a first predefined character, and wherein the first and second predefined characters are separated by an action prompt text.

16. A communication device, comprising:

a processor, a non-transitory computer-readable memory operatively coupled to the processor, a client messaging engine operatively coupled to the processor, and a user interface operatively coupled to the processor, wherein the processor is configured to control the client messaging engine and the user interface to:

receive at least one SMS message, wherein the at least one SMS message comprises a suggested action section comprising a predefined character pattern followed by one or several character sequences respectively corresponding to actions responsive to the received at least one SMS message suggested to a user recipient of the at least one SMS message, the predefined character pattern marking a boundary in the at least one SMS message of the suggested action section, the predefined character pattern being sufficiently unique to enable the communication device to use the predefined character pattern to separate the suggested action section from other characters of said at least one SMS message;

interpret the predefined character pattern;

identify in the at least one SMS message the suggested action section, based on the interpretation of the predefined character pattern, by using the predefined character pattern to separate the suggested action section from the other characters of said at least one SMS message;

process the identified suggested action section in order to identify in the suggested action section the one or several character sequences, based on the interpretation of the predefined character pattern and to extract from the identified suggested action section the identified one or several character sequences; and restitute on the user interface the one or several character sequences and at least one command corresponding to an action among actions responsive.

17. A non-transitory computer-readable memory comprising computer program product stored thereon and comprising computer program code, said computer program code comprising instructions to, when provided to a computer system and executed, cause said computer system to:

generate at least one SMS message, comprising including in the at least one SMS message a suggested action section comprising a predefined character pattern followed by one or several character sequences respectively corresponding to actions responsive to the at least one SMS message suggested to a user recipient of the at least one SMS message, said at least one SMS message being intended for a recipient device with processing capabilities for interpreting said predefined character pattern, the predefined character pattern marking a boundary in the at least one SMS message of the suggested action section, the predefined character pattern being chosen sufficiently unique to enable use of the predefined character pattern, by the communication device, to separate the suggested action section from other characters of said at least one SMS message; and sending the at least one SMS message to the recipient device.

18. A non-transitory computer-readable memory comprising computer program product stored thereon and comprising computer program code, said computer program code comprising instructions to, when provided to a computer system and executed, cause said computer system to:

receive at least one SMS message, wherein the at least one SMS message comprises a suggested action section comprising a predefined character pattern followed by one or several character sequences respectively corresponding to actions responsive to the received at least one SMS message suggested to a user recipient of the at least one SMS message, the predefined character pattern marking a boundary in the at least one SMS message of the suggested action section, the predefined character pattern being sufficiently unique to enable said computer system to use the predefined character pattern to separate the suggested action section from other characters of said at least one SMS message;

interpret the predefined character pattern;

identify in the at least one SMS message the suggested action section, based on the interpretation of the predefined character pattern, by using the predefined character pattern to separate the suggested action section from the other characters of said at least one SMS message;

process the identified suggested action section in order to identify in the identified in the suggested action section the one or several character sequences, based on the interpretation of the predefined character pattern and to extract from the identified suggested action section the identified one or several character sequences; and restitute on a user interface the one or several character sequences and at least one command corresponding to an action among actions responsive.

* * * * *